US012566630B2

(12) United States Patent (10) Patent No.: US 12,566,630 B2
Hung et al. (45) Date of Patent: Mar. 3, 2026

(54) DISTRIBUTED SCHEDULING SYSTEM AND DISTRIBUTED SCHEDULING METHOD WITH INDEPENDENT DATABASES TO PREVENT SINGLE POINT FAILURE

(71) Applicants: DIGIWIN CO., LTD., Shanghai (CN); DATA SYSTEMS CONSULTING CO., LTD., New Taipei City (TW)

(72) Inventors: Shih-Shuan Hung, Taichung City (TW); Shiou Jye Lu, New Taipei City (TW); Dong Li, Shanghai (CN); Guoxin Sun, Shanghai (CN)

(73) Assignees: DIGIWIN CO., LTD., Shanghai (CN); DATA SYSTEMS CO., LTD., New Taipei City (TW)

( * ) Notice: Subject to any disclaimer, the term of this patent is extended or adjusted under 35 U.S.C. 154(b) by 602 days.

(21) Appl. No.: 17/987,860

(22) Filed: Nov. 16, 2022

(65) Prior Publication Data

US 2024/0103906 A1 Mar. 28, 2024

(30) Foreign Application Priority Data

Sep. 26, 2022 (CN) .......................... 202211176773.6

(51) Int. Cl.
*G06F 9/48* (2006.01)
*G06F 13/362* (2006.01)

(52) U.S. Cl.
CPC .......... *G06F 9/4881* (2013.01); *G06F 13/362* (2013.01)

(58) Field of Classification Search
None
See application file for complete search history.

(56) References Cited

U.S. PATENT DOCUMENTS 9,329,937 B1 * 5/2016 Grant .................. G06F 11/2025
9,507,633 B2 * 11/2016 Kurihara .................. G06F 9/52
10,037,225 B2 * 7/2018 Jeong .................... G06F 9/5061
(Continued)

OTHER PUBLICATIONS

Banino et al. "Scheduling Strategies for Master-Slave Tasking on Heterogeneous Processor Platforms", 2004 IEEE, pp. 319-330.*
(Continued)

*Primary Examiner* — Van H Nguyen
(74) *Attorney, Agent, or Firm* — JCIPRNET

(57) ABSTRACT

A distributed scheduling system includes a master scheduling platform and a slave scheduling platform. The number of the master scheduling platform and the number of the slave scheduling platform may be dynamically expanded respectively. When a back-end operating platform provides a scheduling data maintenance request to the master scheduling platform, the master scheduling platform provides scheduling data maintenance information to the slave scheduling platform according to the scheduling data maintenance request, so that the slave scheduling platform performs maintenance on scheduling data according to the scheduling data maintenance information. When a scheduling task execution condition of the scheduling data is met, the slave scheduling platform initiates a task, and calls a corresponding micro service to execute a business logic of the scheduling data. The distributed scheduling system and a distributed scheduling method realize highly available distributed scheduling functions.

14 Claims, 6 Drawing Sheets

(56) References Cited

U.S. PATENT DOCUMENTS

| 10,521,382 B2* | 12/2019 | Cho | ........................ | G06F 13/24 |
| 2016/0019089 A1* | 1/2016 | Jeong | .................... | G06F 9/5027 |
| | | | | 718/102 |

OTHER PUBLICATIONS

Pineau et al. "The impact of heterogeneity on master-slave on-line scheduling", 2006 IEEE, 15 pages.*

* cited by examiner

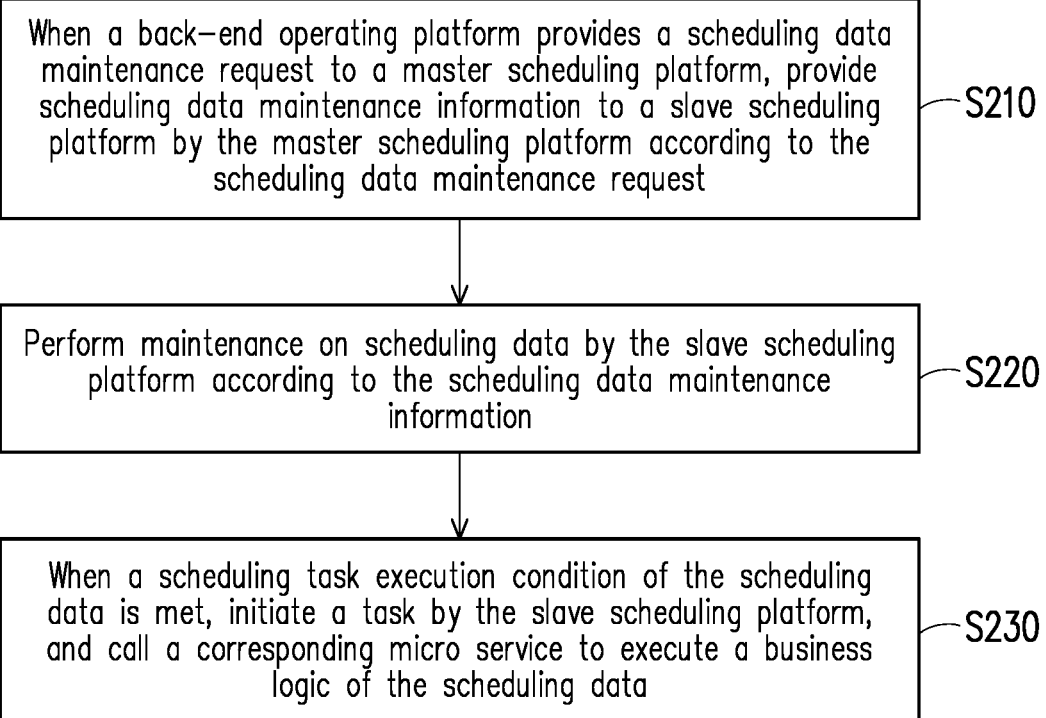

When a back-end operating platform provides a scheduling data maintenance request to a master scheduling platform, provide scheduling data maintenance information to a slave scheduling platform by the master scheduling platform according to the scheduling data maintenance request ⌐S210

Perform maintenance on scheduling data by the slave scheduling platform according to the scheduling data maintenance information ⌐S220

When a scheduling task execution condition of the scheduling data is met, initiate a task by the slave scheduling platform, and call a corresponding micro service to execute a business logic of the scheduling data ⌐S230

FIG. 2

DISTRIBUTED SCHEDULING SYSTEM AND DISTRIBUTED SCHEDULING METHOD WITH INDEPENDENT DATABASES TO PREVENT SINGLE POINT FAILURE

CROSS-REFERENCE TO RELATED APPLICATION

This application claims the priority benefit of China application serial no. 202211176773.6, filed on Sep. 26, 2022. The entirety of the above-mentioned patent application is hereby incorporated by reference herein and made a part of this specification.

BACKGROUND

Technical Field

The invention relates to a system, and more particularly, to a distributed scheduling system and a distributed scheduling method.

Description of Related Art

Software as a service (SaaS) is currently a mainstream framework of enterprise application systems. In this regard, general users do not need to purchase software by themselves, but rent web software functions according to their needs instead to implement related enterprise operations and management. In this mode, enterprise users do not need to build and manage the software and its operating environment by themselves, which may effectively reduce the needs to purchase and maintain the software and its necessary operating equipment, so that the enterprises may use the required software functions more flexibly.

However, in the SaaS environment, compared with a single deployed on-site system, if the enterprise application system becomes unstable, an affected range will be wider, and may cause significant losses to tenants and operators of the application functions. Therefore, the enterprise application system under the SaaS framework has higher requirements on stability and availability.

At present, task scheduling is a widely used technology in the enterprise application systems. In addition, in order to ensure that the overall system framework will not operate abnormally due to a single point failure, a highly available and elastically scalable scheduling scheme has become a necessary condition in the SaaS environment. In order to meet such situation, there are many scheduling schemes at present. For example, a distributed framework is widely used in collaboration with a process engine to ensure high availability and scalability in a running phase of the scheduling task. However, these methods may achieve the effect of high availability in the running phase, but a problem that a database becomes a single bottleneck point still cannot be resolved. In particular, when the number of the scheduling tasks is large and a load amount increases, the database will not be able to carry effectively, which may further lead to decline of the performance of the entire task scheduling or even inoperability of the task scheduling.

SUMMARY

The invention is directed to a distributed scheduling system and a distributed scheduling method, which may realize a distributed scheduling function of high availability.

According to an embodiment of the invention, the distributed scheduling system of the invention includes a master scheduling platform and a slave scheduling platform. The slave scheduling platform is connected to the master scheduling platform. When a back-end operating platform provides a scheduling data maintenance request to the master scheduling platform, the master scheduling platform provides scheduling data maintenance information to the slave scheduling platform according to the scheduling data maintenance request, so that the slave scheduling platform performs maintenance on scheduling data according to the scheduling data maintenance information. When a scheduling task execution condition of the scheduling data is met, the slave scheduling platform initiates a task, and calls a corresponding micro service to execute a business logic of the scheduling data.

According to an embodiment of the invention, the distributed scheduling method of the invention includes the following. When a back-end operating platform provides a scheduling data maintenance request to a master scheduling platform, scheduling data maintenance information is provided to a slave scheduling platform by the master scheduling platform according to the scheduling data maintenance request. Maintenance is performed on scheduling data by the slave scheduling platform according to the scheduling data maintenance information. When a scheduling task execution condition of the scheduling data is met, a task is initiated by the slave scheduling platform, and a corresponding micro service is called to execute a business logic of the scheduling data.

Based on the above, the distributed scheduling system and the distributed scheduling method of the invention may realize a distributed scheduling framework of high availability by setting a master scheduling platform and at least one slave scheduling platform, and the distributed scheduling system of the invention may maintain high operating performance under high availability.

In order for the aforementioned features and advantages of the invention to be more comprehensible, several embodiments accompanied with drawings are described in detail as follows.

BRIEF DESCRIPTION OF THE DRAWINGS

FIG. 2 is a flowchart of a distributed scheduling method according to an embodiment of the invention.

DESCRIPTION OF THE EMBODIMENTS

Figure 1:
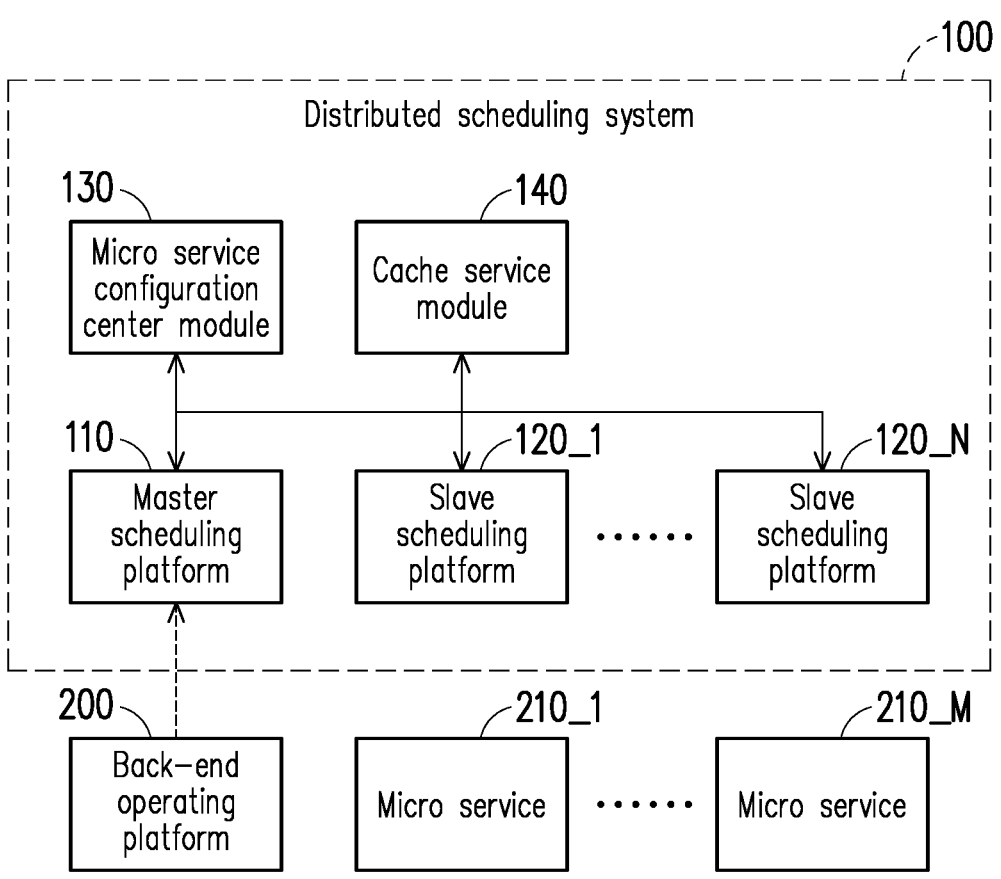
FIG. 1 is a schematic diagram of a distributed scheduling system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a distributed scheduling system according to an embodiment of the invention. Referring to FIG. 1, a distributed scheduling system 100 includes a master scheduling platform 110, slave scheduling platforms 120_1 to 120_N, a micro service configuration center module 130 and a cache service module 140, where N is a positive integer. In the embodiment, the micro service configuration center module 130 and the cache service module 140 may be respectively connected to the master scheduling platform 110 and the slave scheduling platforms 120_1 to 120_N, and the master scheduling platform 110 and the slave scheduling platforms 120_1 to 120_N may be connected to each other. In the embodiment, a back-end operating platform 200 may be connected to the master scheduling platform 110. A user may provide a scheduling data maintenance request to the master scheduling platform 110 through the back-end operating platform 200 to perform scheduling task maintenance. In addition, when one of the slave scheduling platforms 120_1 to 120_N determines that a scheduling task execution condition of the scheduling data is met, the one of the slave scheduling platforms 120_1 to 120_N may call at least one of micro services 210_1 to 210_M to execute a business logic of the scheduling data.

In the embodiment, the master scheduling platform 110, the slave scheduling platforms 120_1 to 120_N, the micro service configuration center module 130 and the cache service module 140 may be independently installed in different electronic equipment, servers or devices with related computing hardware, or a part of them may be installed in the same electronic equipment, the same server, or the same device with related computing hardware. The master scheduling platform 110, the slave scheduling platforms 120_1 to 120_N, the micro service configuration center module 130 and the cache service module 140 may be respectively stored in the same or different storage devices, and may be executed by the same or different processors. The processor may include, for example, a central processing unit (CPU), or other programmable general-purpose or special-purpose microprocessors, a digital signal processor (DSP), an application specific integrated circuit (ASIC), a programmable logic device (PLD), other similar processing circuits, or a combination of these devices. The storage device may include a memory and/or a database. The storage device may be, for example, a non-volatile memory (NVM). The storage device may store related programs, modules, systems or algorithms for implementing the embodiments of the invention, so that the processor may access and execute them to implement the related functions and operations described in the embodiments of the invention.

In the embodiment, the master scheduling platform 110, the slave scheduling platforms 120_1 to 120_N, the micro service configuration center module 130, and the cache service module 140 may be respectively implemented by program languages such as JavaScript object notation (JSON), extensible markup language (XML) or YAML, etc., but the invention is not limited thereto.

In the embodiment, the distributed scheduling system 100 may be built in cloud, and may be used to implement, for example, functions and a framework of software as a service (SaaS). In an embodiment, the master scheduling platform 110 may be connected to the slave scheduling platforms 120_1 to 120_N through the Internet, and the slave scheduling platforms 120_1 to 120_N may also be connected to and call the micro service 210_1 to 210_M through the Internet (for example, based on a hypertext transfer protocol (HTTP)). The back-end operating platform may also be connected to the master scheduling platform 110 through the Internet to perform maintenance on the scheduling data, where the maintenance includes operations such as adding, deleting or modifying of the scheduling data.

FIG. 2 is a flowchart of a distributed scheduling method according to an embodiment of the invention. Referring to FIG. 1 and FIG. 2, the distributed scheduling system 100 may perform following steps S210 to S230. In step S210, when the back-end operating platform 200 provides the scheduling data maintenance request to the master scheduling platform 110, the master scheduling platform 110 provides scheduling data maintenance information to the slave scheduling platforms 120_1 to 120_N according to the scheduling data maintenance request. In step S220, the scheduling platforms 120_1 to 120_N perform maintenance of the scheduling data according to the scheduling data maintenance information. In step S230, when the scheduling task execution condition of the scheduling data is met, the slave scheduling platforms 120_1 to 120_N initiate a task, and calls the corresponding micro service to execute a business logic of the scheduling data.

In the embodiment, the master scheduling platform 110 may be executed, for example, by an application server, and is further connected to a database server. The master scheduling platform 110 may be used for maintenance services of scheduling tasks such as adding, deleting or modifying. The master scheduling platform 110 may send the scheduling data maintenance information and the scheduling task information to each of the slave scheduling platforms 120_1 to 120_N, and the scheduling data may be stored in each of the slave scheduling platforms 120_1 to 120_N synchronously. In the embodiment, the master scheduling platform 110 is not responsible for actually running the scheduling task.

In the embodiment, the slave scheduling platforms 120_1 to 120_N may be respectively executed by, for example, one or a plurality of application servers, and may also be respectively connected to one or a plurality of database servers. In an embodiment, at least one of the slave scheduling platforms 120_1 to 120_N may share a same database server. In the embodiment, each of the slave scheduling platforms 120_1 to 120_N may send a request to the corresponding micro service according to a scheduling task setting in the scheduling data, so as to, for example, run the corresponding micro service regularly or periodically. Each of the slave scheduling platforms 120_1 to 120_N may respectively store complete (all) scheduling task setting information, but only the slave scheduling platform designated (designate execution) by the micro service configuration center module 130 will execute the corresponding scheduling task.

In the embodiment, the micro service configuration center module 130 is used to configure scheduling task assignments respectively corresponding to the scheduling platforms 120_1 to 120_N. In the embodiment, the cache service module 140 may be used for heartbeat monitoring of the master scheduling platform 110 and the slave scheduling platforms 120_1 to 120_N, and may dynamically get online related records.

Figure 3:
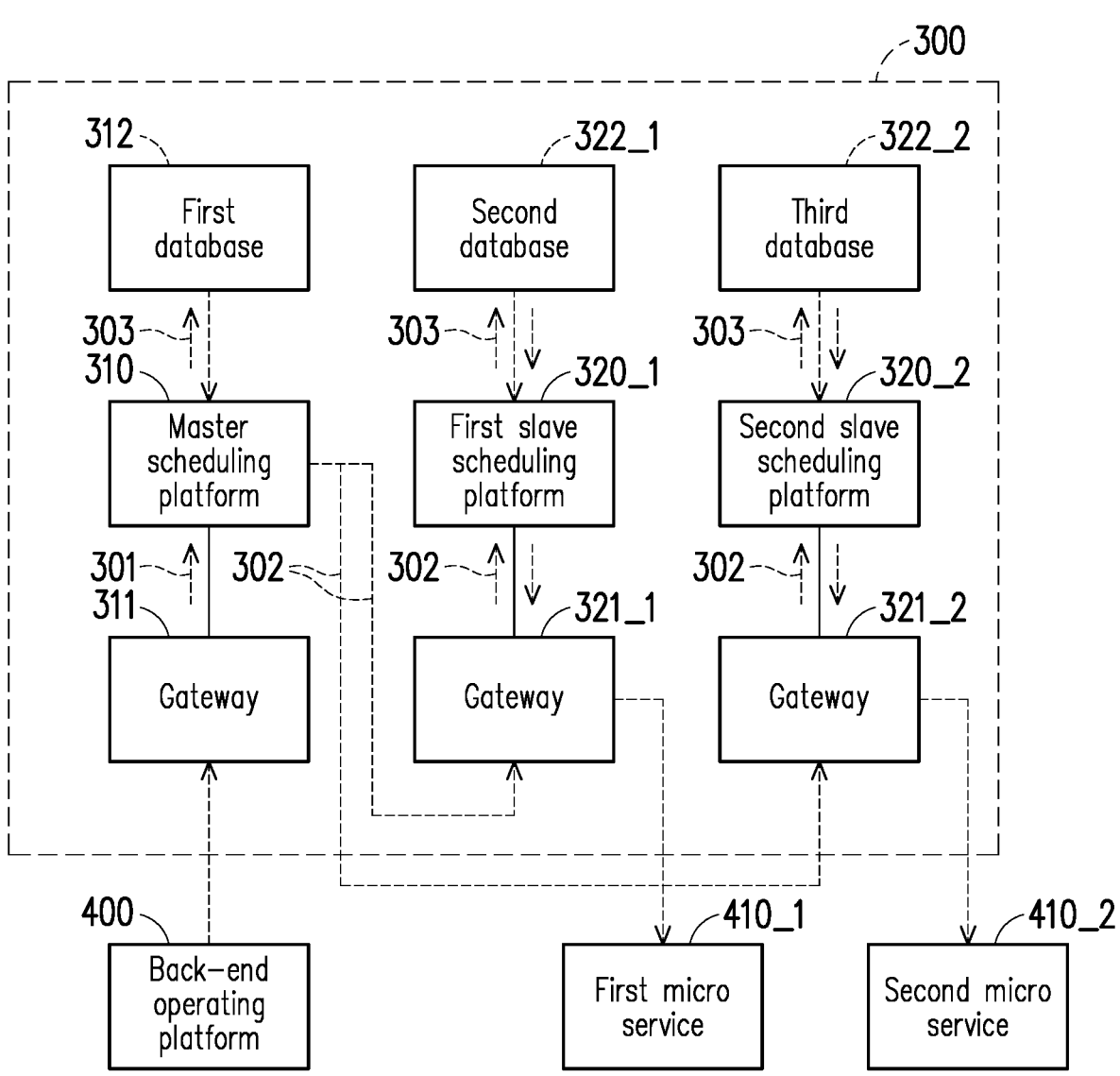
FIG. 3 is a schematic implementation diagram of a distributed scheduling system according to an embodiment of the invention.
Figure 4:
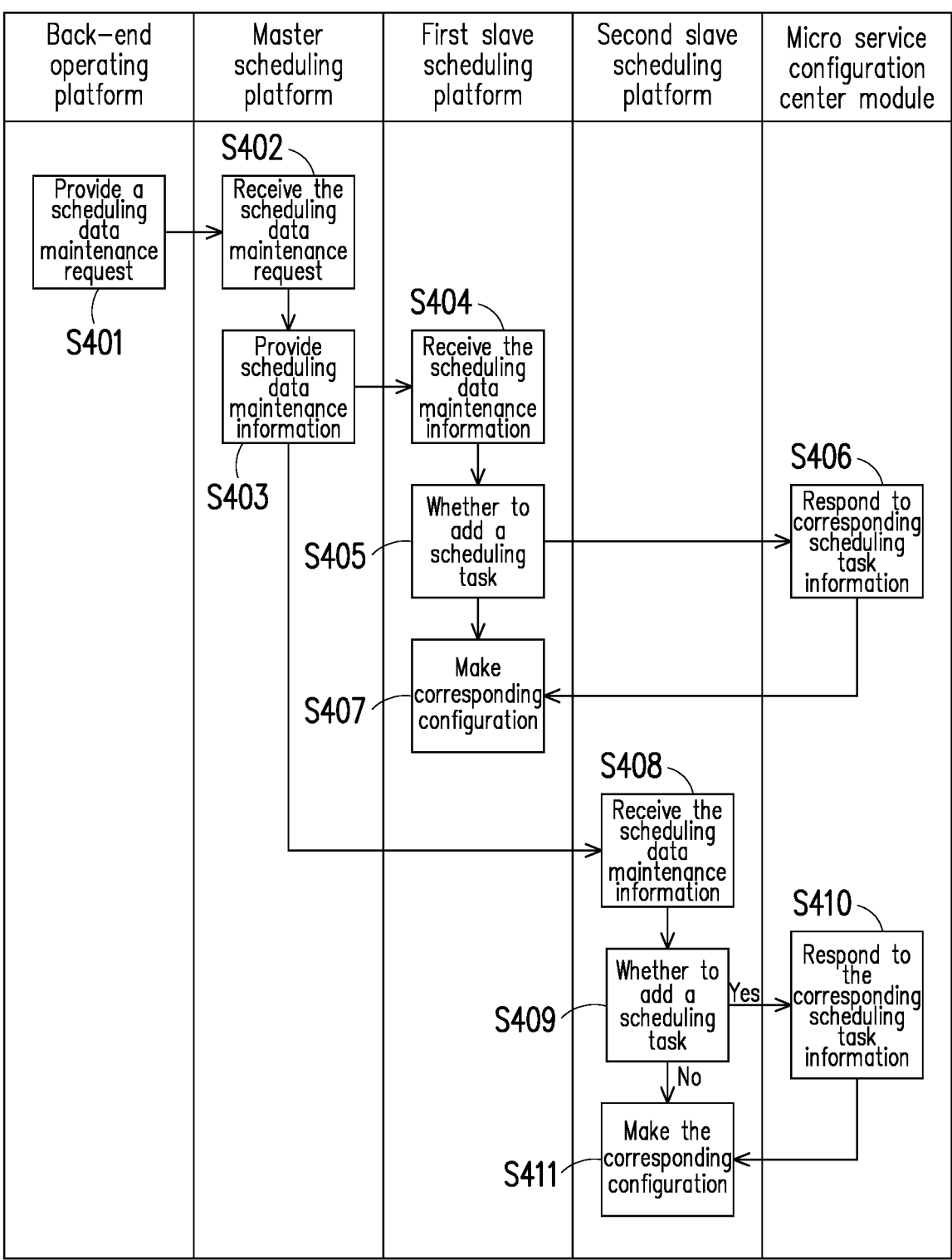
FIG. 4 is a flowchart of performing scheduling data maintenance according to an embodiment of the invention.

FIG. 3 is a schematic implementation diagram of a distributed scheduling system according to an embodiment of the invention. FIG. 4 is a flowchart of performing scheduling data maintenance according to an embodiment of the invention. Referring to FIG. 3 and FIG. 4, in the embodiment, a distributed scheduling system 300, for example, includes a master scheduling platform 310, a first slave scheduling platform 320_1 and a second slave scheduling platform 320_2. The distributed scheduling system 300 may perform following steps S401 to S411 to implement scheduling data maintenance. The master scheduling platform 310, the first slave scheduling platform 320_1, and the second slave scheduling platform 320_2 respectively correspond to gateways 311, 321_1, and 321_2. In the embodiment, the master scheduling platform 310 may be connected to a first database 312. A back-end operating platform 400 may be connected to the master scheduling platform 310 through the gateway 311. In step S401, the back-end operating platform 400 may provide a scheduling data maintenance request 301 to the master scheduling platform 310 through the gateway 311. In step S402, the master scheduling platform 310 may receive the scheduling data maintenance request 301. In step S403, the master scheduling platform 310 may respectively provide scheduling data maintenance information 302 to the first slave scheduling platform 320_1 and the second slave scheduling platform 320_2 through the gateways 321_1 and 321_2.

In steps S404 and S408, the first slave scheduling platform 320_1 and the second slave scheduling platform 320_2 may respectively receive the scheduling data maintenance information 302. In steps S405 and S409, the first slave scheduling platform 320_1 and the second slave scheduling platform 320_2 may respectively determine whether to add a scheduling task according to the scheduling data maintenance information 302. If yes (the scheduling data maintenance information 302 is newly added scheduling data information), the first slave scheduling platform 320_1 and the second slave scheduling platform 320_2 may respectively notify the micro service configuration center module (for example, the micro service configuration center module 130 of FIG. 1) to add a scheduling task. In step S406 and step S410, the micro service configuration center module may respectively respond to the corresponding scheduling task information to the first slave scheduling platform 320_1 and the second slave scheduling platform 320_2 to add a scheduling task. The first slave scheduling platform 320_1 may store newly added scheduling data 303 to a second database 322_1, and the second slave scheduling platform 320_2 may store the newly added scheduling data 303 to a third database 322_2. Similarly, the master scheduling platform 310 may also store the newly added scheduling data 303 to the first database 312. If not (the scheduling data maintenance information 302 is to modify or delete the schedule data). In step S407 and step S411, the first slave scheduling platform 320_1 and the second slave scheduling platform 320_2 may respectively maintain the scheduling data stored in the second database 322_1 and the third database 322_2 according to the scheduling data maintenance information 302. Similarly, the master scheduling platform 310 may maintain the same scheduling data stored in the first database 312.

Figure 5:
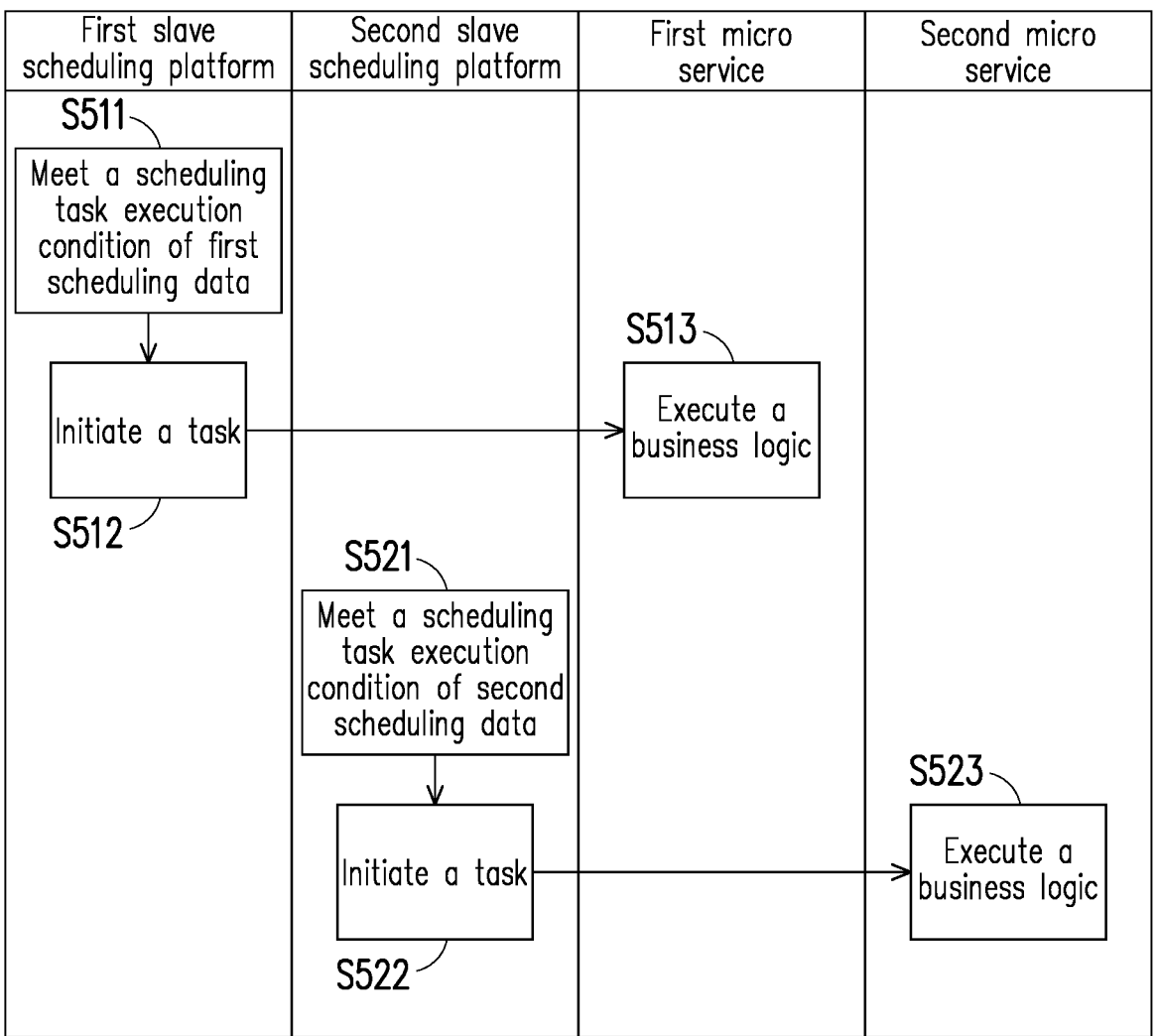
FIG. 5 is a flowchart of a scheduling task operation according to an embodiment of the invention.

In the embodiment, when the master scheduling platform 310 obtains the scheduling data from the back-end operating platform 400, the master scheduling platform 310 may be connected to the gateway 321_1 of the first slave scheduling platform 320_1 via a network to provide the scheduling data to the first slave scheduling platform 320_1. Moreover, the master scheduling platform 310 may also be connected to the gateway 321_2 of the second slave scheduling platform 320_2 via the network, so as to provide the scheduling data to the second slave scheduling platform 320_2 as well. The master scheduling platform 310, the first slave scheduling platform 320_1 and the second slave scheduling platform 320_2 may respectively store the scheduling data in different databases. The first slave scheduling platform 320_1 and the second slave scheduling platform 320_2 may use the same database, or the first slave scheduling platform 320_1 and the second slave scheduling platform 320_2 may use different databases. In other words, the distributed scheduling system 300 of the embodiment may store (back up) the scheduling data in independent databases corresponding to different slave scheduling platforms. FIG. 5 is a flowchart of a scheduling task operation according to an embodiment of the invention. Referring to FIG. 3 to FIG. 5, the distributed scheduling system 300 may perform following steps S511 to S513 and S521 to S523. It should be noted first that data content of the scheduling data in the various embodiments of the invention may include, for example, a scheduling number, a scheduling name, a scheduling type, a scheduling start state, a scheduling effective time, a scheduling expiration time, a scheduling parameter, a next execution time, a tenant number, a module name, a task number, etc., but the invention is not limited thereto. In the embodiment, the scheduling number may be, for example, generated in the form of a hash code to ensure that one scheduling is executed by only one slave scheduling platform. In the embodiment, the scheduling type may be used to, for example, define the scheduling as scheduled execution or periodic execution. The scheduling parameter may, for example, record a relevant link and execution information of the micro service to be correspondingly executed.

In the embodiment, the first slave scheduling platform 320_1 and the second slave scheduling platform 320_2 may respectively execute a business logic of the corresponding scheduling data according to the correspondingly configured scheduling type and next execution time of the scheduling data, so as to respectively call the corresponding first micro service 410_1 and the second micro service 410_2 through the gateway 321_1 and the gateway 321_2. To be specific, in step S511, the first slave scheduling platform 320_1 determines whether a scheduling task execution condition of first scheduling data is met. In step S512, when the scheduling task execution condition of the first scheduling data is met, the first slave scheduling platform 320_1 may initiate a task according to data content of the first scheduling data, so as to call the first micro service 410_1 through the gateway 321_1. The first slave scheduling platform 320_1 may provide relevant execution information and business data to the first micro service 410_1. In step S513, the first micro service 410_1 may execute the corresponding business logic to generate an execution result, and may, for example, send the execution result to a terminal device of a user or a tenant.

Similarly, in step S521, the second slave scheduling platform 320_2 determines whether a scheduling task execution condition of second scheduling data is met. In step S522, when the scheduling task execution condition of the second schedule data is met, the second slave schedule platform 320_2 may initiate a task according to data content of the second schedule data, so as to call the second micro service 410_2 through the gateway 321_2. The second slave scheduling platform 320_2 may provide relevant execution information and business data to the second micro service 410_2. In step S523, the second micro service 410_2 may execute the corresponding business logic to generate an execution result, and may, for example, send the execution result to a terminal device of the user or the tenant. Therefore, the distributed scheduling system 300 of the embodiment may achieve high operating performance through a distributed scheduling framework.

In addition, it should be noted that the above-mentioned first scheduling data and second scheduling data are stored in the first database 312, the second database 322_1 and the third database 322_2 synchronously. The first scheduling data may be configured in advance by the micro service configuration center module for being executed by the first slave scheduling platform 320_1, and the second scheduling data may be configured in advance by the micro service configuration center module for being executed by the second slave scheduling platform 320_2.

Figure 6:
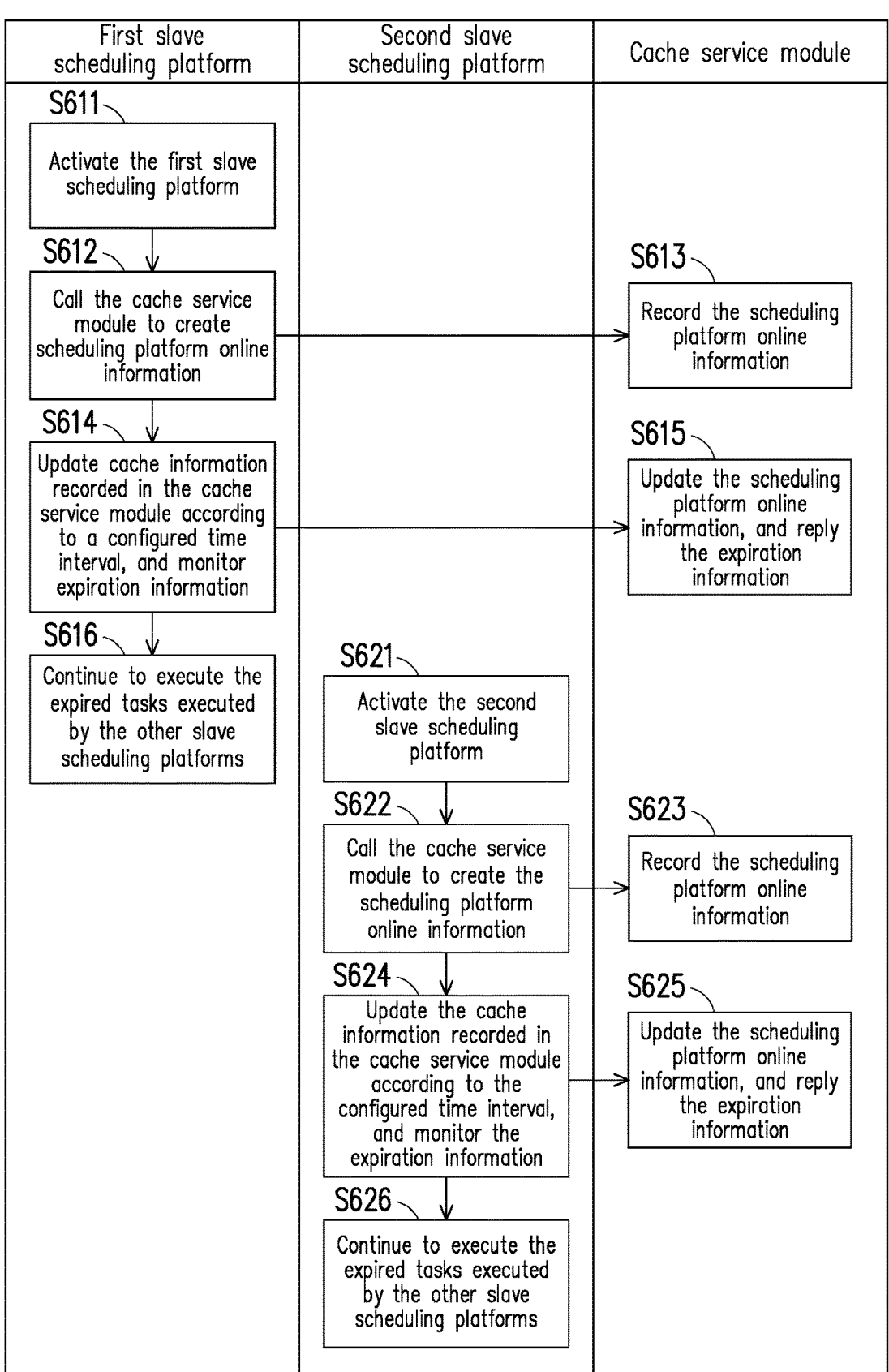
FIG. 6 is a flowchart of executing scheduling dynamic online according to an embodiment of the invention.

FIG. 6 is a flowchart of executing scheduling dynamic online according to an embodiment of the invention. Referring to FIG. 3 to FIG. 6, the distributed scheduling system 300 may perform following steps S611 to S616 and S621 to S626, so as to achieve scheduling dynamic online. In step S611, the first slave scheduling platform 320_1 is activated. In step S612, the first slave scheduling platform 320_1 may call a cache service module (for example, the cache service module 140 in FIG. 1) to create scheduling platform online information. In step S613, the cache service module records the scheduling platform online information. In step S614, the first slave scheduling platform 320_1 may update cache information recorded in the cache service module according to a configured time interval (a preset update period), and monitor expiration information. In step S615, the cache service module may update the scheduling platform online information, and reply the expiration information. In other words, if the first slave scheduling platform 320_1 finds that other slave scheduling platforms are offline or expired to perform the scheduled scheduling task, the first slave scheduling platform 320_1 may notify the cache service module, and the micro service configuration center module may reconfigure the scheduled scheduling task that is not executed after expiration to the first slave scheduling platform 320_1. In this regard, the second database 322_1 of the first slave scheduling platform 320_1 has pre-stored all of the scheduling data synchronously. Therefore, in step S616, the first slave scheduling platform 320_1 may continue to execute the expired tasks executed by the other slave scheduling platforms.

Similarly, in step S621, the second slave scheduling platform 320_2 is activated. In step S622, the second slave scheduling platform 320_2 may call the cache service module to create the scheduling platform online information. In step S623, the cache service module records the scheduling platform online information. In step S624, the second slave scheduling platform 320_2 may update the cache information recorded in the cache service module according to a configured time interval (a preset update period), and monitor the expiration information. In step S625, the cache service module may update the scheduling platform online information, and reply the expiration information. In other words, if the second slave scheduling platform 320_2 finds that other slave scheduling platforms are offline or expired to perform the scheduled scheduling task, the second slave scheduling platform 320_2 may notify the cache service module, and the master scheduling platform 310 may reconfigure the scheduled scheduling task that is expired in execution to the second slave scheduling platform 320_2. In this regard, the third database 322_2 of the second slave scheduling platform 320_2 has pre-stored all of the scheduling data synchronously. Therefore, in step S626, the second slave scheduling platform 320_2 may continue to execute the tasks performed by the expired other slave scheduling platforms.

In other words, when the first slave scheduling platform 320_1 determines that the second slave scheduling platform 320_2 (or other slave scheduling platforms) is offline or is expired to execute the scheduled scheduling task of the second scheduling data, the cache service module may update the scheduling platform online information, and the micro service configuration center module may reconfigure the scheduled scheduling task of the second scheduling data that is not executed to the first slave scheduling platform 320_1, so that the first slave scheduling platform 320_1 may execute the scheduling task of the second scheduling data. Similarly, when the second slave scheduling platform 320_2 determines that the first slave scheduling platform 320_1 (or other slave scheduling platforms) is offline or is expired to execute the scheduled task of the scheduled first scheduling data, the cache service module may update the schedule platform online information, and the master scheduling platform 310 may reconfigure the scheduled scheduling task of the first scheduling data that is not executed to the second slave scheduling platform 320_2, so that the second slave scheduling platform 320_2 may execute the scheduling task of the first scheduling data.

Moreover, when the first slave scheduling platform 320_1 (or the second slave scheduling platform 320_2) finds that the master scheduling platform 310 is in an offline state, the first slave scheduling platform 320_1 may initiate a broadcast to other slave scheduling platforms, and when the first slave scheduling platform 320_1 receives more than a preset number of responses from other slave scheduling platforms (for example, 50% of the scheduling platforms agree), the first slave scheduling platform 320_1 may be changed to a new master scheduling platform. In other words, even if the master scheduling platform 310 of the embodiment fails, it will not affect running of the scheduling task, and its function may be replaced by a certain slave scheduling platform. Therefore, the distributed scheduling system 300 of the embodiment may implement a highly available distributed scheduling framework. When one of the slave scheduling platforms or the master scheduling platform 310 fails, the other slave scheduling platforms may automatically receive and execute its scheduling task or functions.

In summary, the distributed scheduling system and the distributed scheduling method of the invention may achieve the effect of high availability by setting independent data sources to the master scheduling platform and each of the slave scheduling platforms, and it is unnecessary to additionally set up other database clusters, so as to effectively avoid resource and efficiency loss. The master scheduling platform of the invention only performs consistency processing of the overall scheduling configuration, and does not participate in running of the scheduling task. In this way, even if the master scheduling platform fails, it will not affect running of the current scheduling task. When the master scheduling platform fails or goes offline, it may be replaced by other slave scheduling platforms. Moreover, the slave scheduling platforms of the invention actually perform assignment and running of the scheduling tasks, and each slave scheduling platform corresponds to an independent database. When equipment of one of the slave scheduling platforms fails, the other slave scheduling platforms may automatically receive and execute its scheduling task or functions, which may effectively avoid collapse of the overall scheduling system due to a single point failure.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:
1. A distributed scheduling system, comprising:
a storage device, storing a plurality of platforms; and a processor, configured to access the storage device and execute the plurality of platforms, wherein the plurality of platforms comprising:

a master scheduling platform;

a slave scheduling platform, connected to the master scheduling platform;

a micro service configuration center module, connected to the master scheduling platform and the slave scheduling platform; and a cache service module, connected to the master scheduling platform and the slave scheduling platform, wherein when a back-end operating platform provides a scheduling data maintenance request to the master scheduling platform, the master scheduling platform provides scheduling data maintenance information to the slave scheduling platform according to the scheduling data maintenance request, so that the slave scheduling platform performs maintenance on scheduling data according to the scheduling data maintenance information, wherein when a scheduling task execution condition of the scheduling data is met, the slave scheduling platform initiates a task, and calls a corresponding micro service to execute a business logic of the scheduling data, wherein when the scheduling data maintenance information is newly added scheduling data information, the slave scheduling platform notifies the micro service configuration center module, so that the micro service configuration center module responds to corresponding scheduling task information to the slave scheduling platform to add a scheduling task, wherein when the slave scheduling platform is activated, the slave scheduling platform calls the cache service module to create scheduling platform online information, and records the scheduling platform online information in the cache service module, and wherein the slave scheduling platform updates cache information recorded in the cache service module according to a configured time interval, and monitors expiration information to continuously execute expired tasks executed by other slave scheduling platforms.

2. The distributed scheduling system according to claim 1, wherein the scheduling data comprises a scheduling type and a next execution time, and the slave scheduling platform executes the business logic of the scheduling data according to the scheduling type and the next execution time to call the corresponding micro service through a gateway.

3. The distributed scheduling system according to claim 1, wherein when the master scheduling platform obtains the scheduling data from the back-end operating platform, the master scheduling platform provides the scheduling data to the slave scheduling platform through a gateway, and the master scheduling platform and the slave scheduling platform respectively store the scheduling data to different databases.

4. The distributed scheduling system according to claim 1, further comprising:

another slave scheduling platform, connected to the master scheduling platform, wherein when the master scheduling platform obtains the scheduling data from the back-end operating platform, the master scheduling platform provides the scheduling data to the another slave scheduling platform through another gateway, and the master scheduling platform and the another slave scheduling platform respectively store the scheduling data to different databases.

5. The distributed scheduling system according to claim 4, wherein the slave scheduling platform and the another slave scheduling platform use a same database.

6. The distributed scheduling system according to claim 4, wherein the slave scheduling platform and the another slave scheduling platform use different databases.

7. The distributed scheduling system according to claim 1, wherein when the slave scheduling platform finds that the master scheduling platform is in an offline state, the slave scheduling platform initiates a broadcast to other slave scheduling platforms, and when the slave scheduling platform receives more than a preset number of responses from the other slave scheduling platforms, the slave scheduling platform is changed to a new master scheduling platform.

8. A distributed scheduling method, comprising:

accessing, by a processor, a storage device storing a plurality of platforms, and executing the plurality of platforms, wherein the plurality of platforms comprising a master scheduling platform, a slave scheduling platform connected to the master scheduling platform, and a micro service configuration center module connected to the master scheduling platform and the slave scheduling platform;

when a back-end operating platform provides a scheduling data maintenance request to the master scheduling platform, providing scheduling data maintenance information to the slave scheduling platform by the master scheduling platform according to the scheduling data maintenance request;

performing maintenance on scheduling data by the slave scheduling platform according to the scheduling data maintenance information;

when a scheduling task execution condition of the scheduling data is met, initiating a task by the slave scheduling platform, and calling a corresponding micro service to execute a business logic of the scheduling data;

when the scheduling data maintenance information is newly added scheduling data information, notifying the micro service configuration center module by the slave scheduling platform, so that the micro service configuration center module responds to corresponding scheduling task information to the slave scheduling platform to add a scheduling task, when the slave scheduling platform is activated, calling a cache service module by the slave scheduling platform to create scheduling platform online information, and recording the scheduling platform online information in the cache service module, and updating cache information recorded in the cache service module by the slave scheduling platform according to a configured time interval, and monitoring expiration information to continuously execute expired tasks executed by other slave scheduling platforms.

9. The distributed scheduling method according to claim 8, wherein the scheduling data comprises a scheduling type and a next execution time, and the slave scheduling platform executes the business logic of the scheduling data according to the scheduling type and the next execution time, so as to call the corresponding micro service through a gateway.

10. The distributed scheduling method according to claim 8, further comprising:

when the master scheduling platform obtains the scheduling data from the back-end operating platform, providing the scheduling data to the slave scheduling platform through a gateway by the master scheduling platform, wherein the master scheduling platform and the slave scheduling platform respectively store the scheduling data to different databases.

11. The distributed scheduling method according to claim 8, further comprising:

when the master scheduling platform obtains the scheduling data from the back-end operating platform, providing the scheduling data to another slave scheduling platform through another gateway by the master scheduling platform, wherein the master scheduling platform and the another slave scheduling platform respectively store the scheduling data to different databases.

12. The distributed scheduling method according to claim 11, wherein the slave scheduling platform and the another slave scheduling platform use a same database.

13. The distributed scheduling method according to claim 11, wherein the slave scheduling platform and the another slave scheduling platform use different databases.

14. The distributed scheduling method according to claim 8, further comprising:

when the slave scheduling platform finds that the master scheduling platform is in an offline state, initiating a broadcast to other slave scheduling platforms by the slave scheduling platform;

when the slave scheduling platform receives more than a preset number of responses from the other slave scheduling platforms, changing the slave scheduling platform to a new master scheduling platform.

* * * * *